United States Patent [19]
Katsuda

[11] Patent Number: 5,705,246
[45] Date of Patent: Jan. 6, 1998

[54] MASTER DISC FOR AN OPTICAL DISC AND METHOD FOR MANUFACTURING THE MASTER DISC

[75] Inventor: Shinichi Katsuda, Tokyo, Japan

[73] Assignee: NEC Corporation, Tokyo, Japan

[21] Appl. No.: 546,948

[22] Filed: Oct. 23, 1995

[30] Foreign Application Priority Data

Oct. 21, 1994 [JP] Japan .................... 6-257087

[51] Int. Cl.$^6$ ...................................... B32B 3/00
[52] U.S. Cl. ................ 428/441; 428/642; 428/644; 428/913; 430/320; 430/321; 430/322; 430/945; 369/116; 369/121
[58] Field of Search ................ 428/64.1, 64.2, 428/64.4, 913; 430/320, 321, 322, 324, 327, 495.1, 945; 369/275.1, 275.4, 116, 121, 124

[56] References Cited

U.S. PATENT DOCUMENTS 4,732,844  3/1988  Ota et al. .................. 430/322

FOREIGN PATENT DOCUMENTS 0596439  5/1994  European Pat. Off. .
3504969  8/1985  Germany .

OTHER PUBLICATIONS

S. Katsuda, et al., "High-density optical disk mastering using UV light source," Optical Data Storage '94, May 1994.

S. Katsuda et al., "Quadrupled Compact Disk-Read Only Memory Fabricated Using UV Light Source," JPN. J. Appl. Phys., vol. 32 (1993) pp. 5581–5583.

Patent Abstracts of Japan, vol. 014, No. 183 (P-1035), Apr. 12, 1990.

Primary Examiner—Elizabeth Evans
Attorney, Agent, or Firm—Sughrue, Mion, Zinn, Macpeak & Seas, PLLC

[57] ABSTRACT

An exposure master disc includes a photoresist laminate formed on a glass substrate. The photoresist laminate includes an i-line type, first photoresist layer and a g-line type, second photoresist layer consecutively formed on the substrate. The photoresist laminate is exposed by a scanning laser light while selecting the exposure power level, to thereby effectively expose the first and second photoresist layers or to effectively expose only the second photoresist layer. The resultant photoresist laminate has first pits revealing the substrate and second pits revealing the first photoresist layer, thereby forming two types of pits having different depths. Two type of pits and flat surface of the photoresist laminate provide three-valued data for a higher storage density.

15 Claims, 7 Drawing Sheets

MASTER DISC FOR AN OPTICAL DISC AND METHOD FOR MANUFACTURING THE MASTER DISC

BACKGROUND OF THE INVENTION (a) Field of the Invention

The present invention relates to a master disc used for forming a stamper for the production of optical disc replicas and, more particularly, to an exposed master disc which is suitable for optical discs having an increased information storage density, such as compact disc read-only-memories (CD-ROMs). The present invention also relates to a method for manufacturing such a master disc.

(b) Description of Related Art

As shown in FIG. 1, a conventional bleached master disc 50 (hereinafter, simply referred to as a master disc) comprises a tempered glass substrate 52 having a flat surface 52a, a photoresist film 54 formed on the surface 52a of the substrate 52 by spin-coating and having a plurality of pits 58 formed in the photoresist film 54 by laser exposure and subsequent development of the photoresist film. The master disc 50 is manufactured by a process as shown in FIGS. 2A and 2B. Photoresist is first applied onto the flat surface 52a of the glass substrate 52 to form the photoresist film 54 (FIG. 2A). Subsequently, the photoresist film 54 is bleached or exposed by using a laser beam L. As a result, portions of the photoresist film 54 which are irradiated by the laser beam L become bleached regions 54a (FIG. 2B). Thereafter, the photoresist film 54 is developed by using an alkali solution to remove the bleached regions 54a, thereby forming the plurality of pits 58 (see FIG. 1).

There is a strong need to further increase the storage density of optical discs. The storage density can be increased, for example, by forming the pits such that they have different depths. However, in order to form a plurality of pits having different depths by using a conventional technique, a series of processes including spin-coating of photoresist and subsequent exposure and development thereof must be repeated a plurality of times to manufacture the master disc, thereby rendering the manufacturing process complex. Also, it is difficult to obtain a desired dimensional accuracy, because errors accumulate and photoresist deteriorates as the number of processes applied thereto increases.

SUMMARY OF THE INVENTION

In view of the foregoing, it is an object of the present invention to provide a master disc and a method for manufacturing the master disc in which a plurality of pits having different depths can be accurately formed in a simplified manner.

A master disc for use in manufacturing a stamper of an optical disc according to the present invention comprises a substrate having a substantially flat surface, a photoresist laminate including a first photoresist layer formed on the flat surface and a second photoresist layer formed on the first photoresist layer, the photoresist laminate having a first pit revealing the flat surface of the substrate and a second pit revealing the first photoresist layer, the second photoresist layer having a photosensitivity higher than the photosensitivity of the first photoresist layer.

A method for manufacturing a master disc for use in manufacturing a stamper of an optical disc includes the steps of: forming on a substrate a photoresist laminate including a lower, first photoresist layer and an upper, second photoresist layer, the second photoresist layer having a photosensitivity higher than the photosensitivity of the first photoresist layer; exposing, by a scanning light source, the photoresist laminate while selecting laser power level of the scanning laser light: and developing the photoresist laminate to form a first pit revealing the substrate and a second pit revealing the first photoresist layer.

In accordance with the present invention, when the scanning exposure power is properly selected during scanning exposure, the exposure can be performed such that the upper, second photoresist layer is effectively exposed while the underlying, first photoresist layer is not effectively exposed. Accordingly, a plurality of pits having different depths can be simply and accurately formed by a single exposure process. This makes it feasible to manufacture high storage density optical discs at reduced costs.

BRIEF DESCRIPTION OF THE DRAWINGS

The above and other objects, features and advantages of the present invention will be more apparent from the following description, referring to the accompanying drawings in which.

DESCRIPTION OF THE PREFERRED EMBODIMENT

Figure 1:
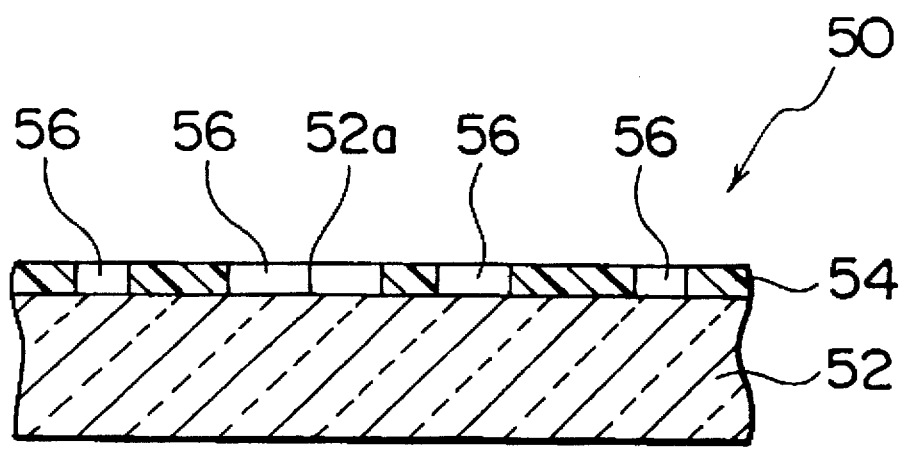
FIG. 1 is a sectional view showing a conventional master disc.
Figure 2A:
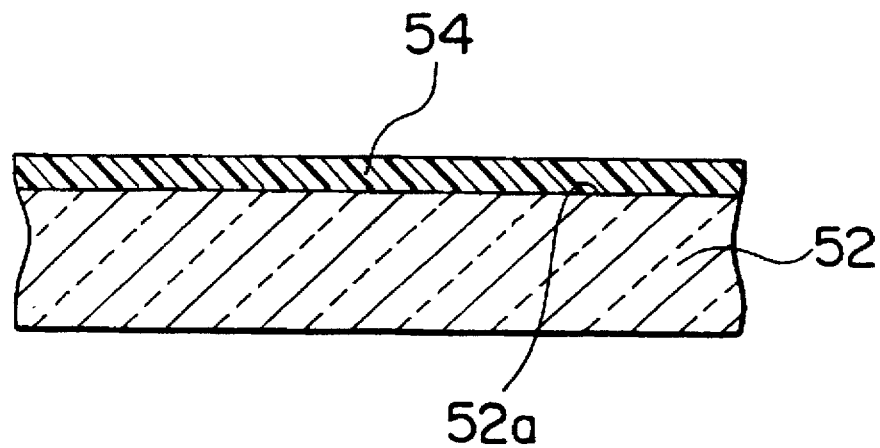
FIGS. 2A and 2B are sectional views of the conventional master disc of FIG. 1 at a stage after spin-coating of photoresist and at a subsequent stage during laser exposure, respectively, showing a conventional method for manufacturing a master disc.
Figure 2B:
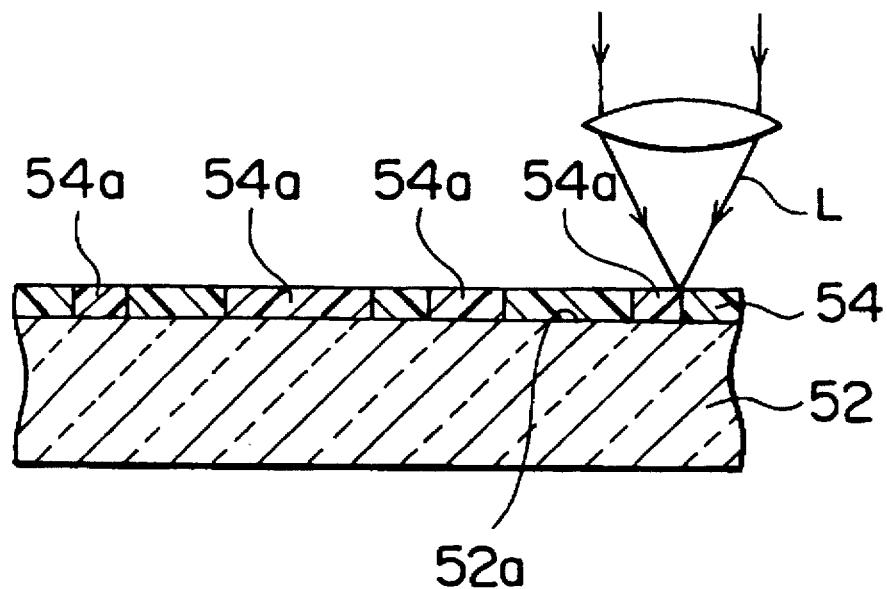
Figure 3:
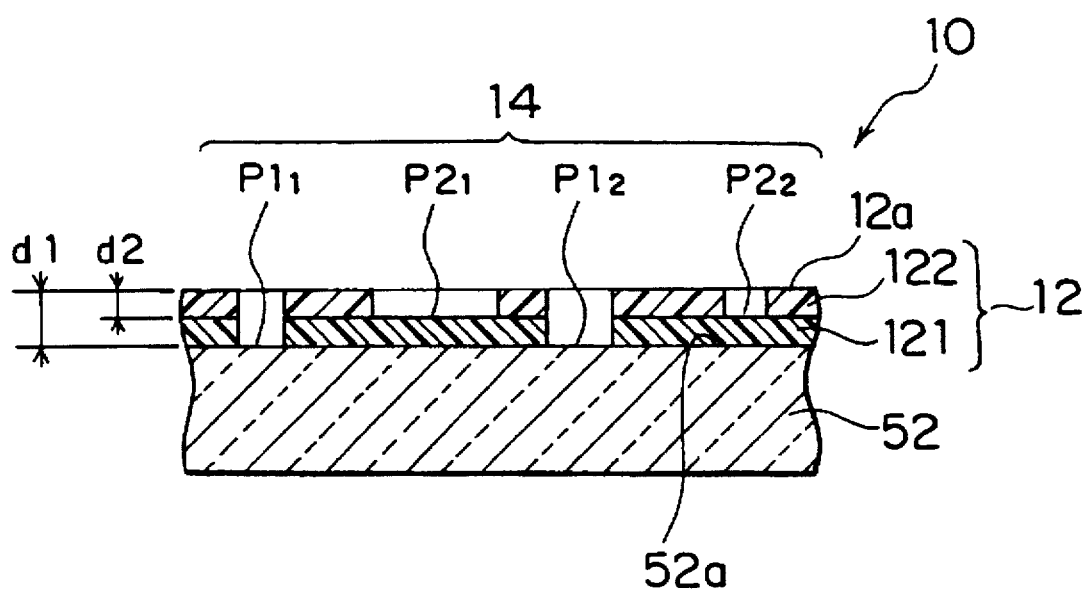
FIG. 3 is a sectional view showing a master disc according to an embodiment of the present invention.

A master disc according to a preferred embodiment of the present invention will now be described with reference to FIG. 3. In the same drawing, similar elements are designated by the same reference numerals as those in FIG. 1.

The master disc 10 according to the present embodiment comprises a tempered glass substrate 52 having a flat surface 52a, and a photoresist laminate 12 formed on the surface 52a of the substrate 52 and having a plurality of pits 14 which are formed in the photoresist laminate 12 by laser exposure and subsequent development thereof. In FIG. 3, the photoresist laminate thickness is enlarged in scale more than the glass substrate thickness.

The photoresist laminate 12 includes two different photoresist layers 121 and 122 consecutively formed on the glass substrate 52. The plurality of pits 14 includes a plurality of first pits $P1_1$, $P1_2$, . . . having a large depth d1 and a plurality of second pits $P2_1$, $P2_2$, . . . having a small depth d2. The depth d1 corresponds to the thickness of the photoresist laminate 12, i.e., the sum of the thicknesses of the first photoresist layer 121 and the second photoresist layer 122 while the depth d2 corresponds to the thickness of the second photoresist layer 122. By this configuration of the master disc 10, during operation of an optical disc manufactured from the master disc, the optical disc has three-valued data thereon so that high density storage can be obtained. Or else, the deep pits $P1_1$, $P1_2$, . . . may be used for a servo-signal for tracking an optical head while the shallow pits $P2_1$, $P2_2$, . . . can be used for data pits constituting read-only-data of the optical disk to be reproduced.

The second photoresist layer 122 is made of a g-line type photoresist, while the first photoresist layer 121 is made of an i-line type photoresist. The g-line type photoresist may be selected from photoresists such as exemplified in Table 1 as #1 and #2. Similarly, the i-line type photoresist may be selected from photoresists such as exemplified in Table 1 as #3 and #4.

TABLE 1

| | Photoresist | | | |
|---|---|---|---|---|
| | #1 | #2 | #3 | #4 |
| Type | g-line | g-line | i-line | i-line |
| Molecular Weight | 7000 | 7000 | 5000 | 3500 |
| Isomer in Side-Chain Structure | para-rich | para-rich | para-rich + α | para-rich + α |
| Resin Content | 30% | 20% | 25% | 20% |
| PAC | benzo-phenone | benzo-phenone | anti-benzo-phenone | benzo-phenone + anti-benzo-phenone |
| PAC Molecular Weight | 700–800 | 700–800 | 700–800 | 700–800 |
| PAC Content | 30% | 20% | 25% | 25% |

PAC: photo-sensitivity-compound
Resin content: for photoresist weight
PAC content: for resin weight
Meta-rich: meta-isomer is more than about 70%
Meta-rich + α: meta-isomer is more than about 60%

Figure 4:
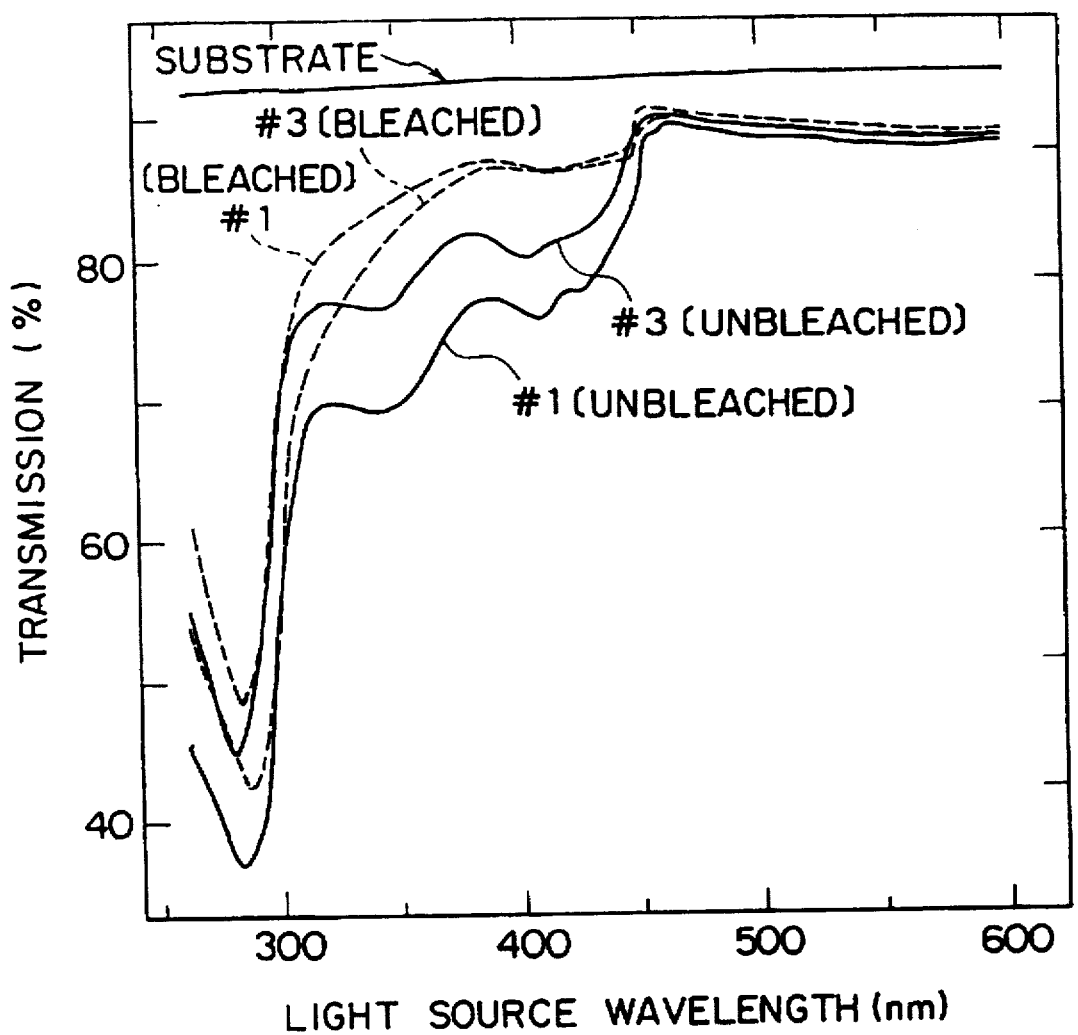
FIG. 4 is a graph of photoresist bleaching characteristic, showing percent transmission of photoresists used in the master disc of FIG. 3 before and after bleaching as a function of light source wavelength.

FIG. 4 shows results of of measurement on the percent transmission of the substrate and percent transmissions of photoresists #1 and #3 as examples of g-line and i-line type photoresists. The graph shows photoresist transmission dependence on the wavelength of the exposure light source. The longer the wavelength, the more is the transmission of the photoresist. Also, the transmission is raised by laser exposure both in the photoresist #1 and #3 for the wavelength between about 300 nm and 1500 nm of the light source. Based on the percent transmission for each of the photoresists, the parameters A and B for the photoresists #1 and #3, as well as for the photoresist #2 and #4, can be obtained by using the following equations:

$$\text{Parameter A} = (1/d) \cdot \ln[T(\infty)/T(0)] \quad (1)$$

$$\text{Parameter B} = -(1/d) \cdot \ln[T(\infty)] \quad (2)$$

wherein d, T(0) and T(∞) are photoresist thickness, transmission before laser exposure, and transmission after saturation laser exposure respectively. The parameter A represents an optical density for a unit thickness of the photoresist, while the parameter B represents an optical density of the photoresist after saturation exposure.

The parameters A and B of the photoresists #1, #2, #3 and #4 for i-line sources are given in Table 2.

TABLE 2

| | #1 | #2 | #3 | #4 |
|---|---|---|---|---|
| Parameter A | 1.23 | 1.22 | 0.74 | 0.94 |
| Parameter B | 0.31 | 0.13 | 0.07 | 0.12 |

The substrate used in the master disc was made of molten silica glass having a thickness of 0.5 mm and each of photoresists was 100 nm thick.

Figure 5:
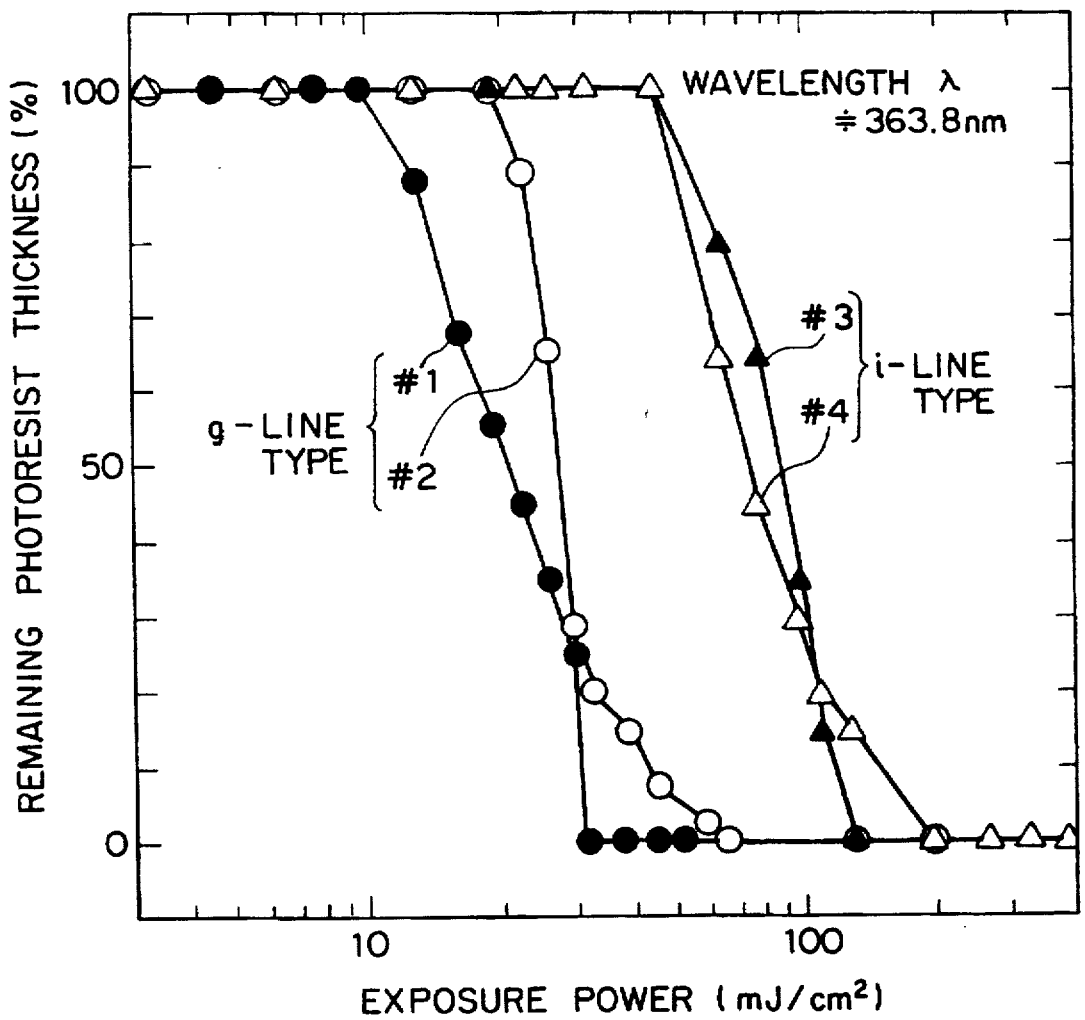
FIG. 5 is a graph of photoresist sensitivity, showing remaining photoresist thickness dependence on exposure light bleaching the photoresists used in the master disc of FIG. 3 for a wavelength of 363.8 nm.

FIG. 5 is a graph of remaining photoresist thickness (%) of each of the photoresists obtained as a function of exposure power (mJ/cm$^2$) for a light source wavelength of λ=363.8, showing gamma characteristic of each of the photoresists for the wavelength. In FIG. 5, the gamma values (γ) of the photoresists #1, #2, #3 and #4 for ultraviolet rays are 2.10, 2.19, 2.14, and 1.58, respectively. When a photoresist exhibits a steep curve in the graph, it means that the photoresist provides an excellent contrast of the topography. The graph also shows that the g-line type photoresists are more sensitive than the i-line type photoresists, because the curves for the g-line type photoresists are located left side of the graph as compared to the curves of the i-line type photoresists.

Figure 6:
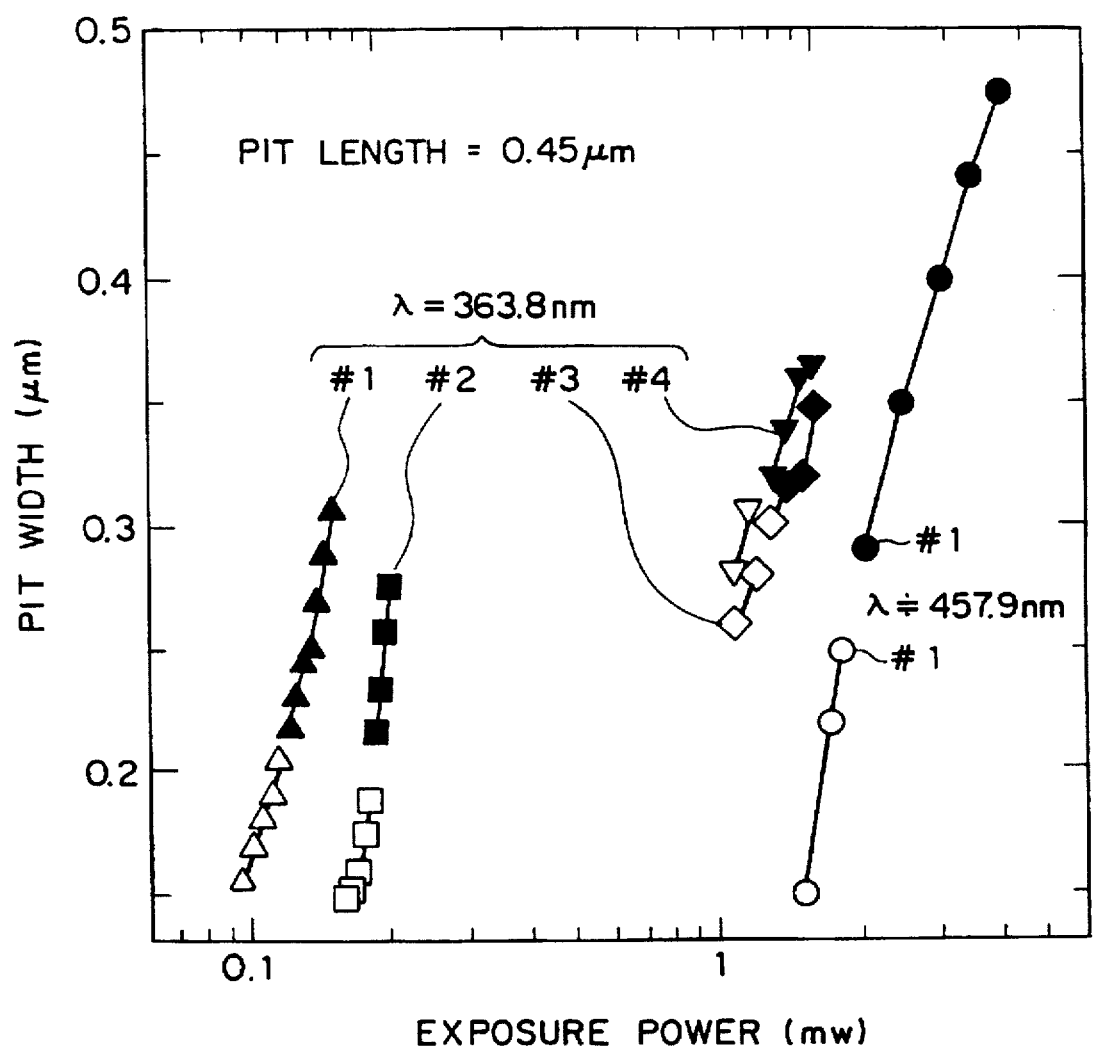
FIG. 6 is a graph of photosensitivities of photoresists used in the master disc of FIG. 3, showing pit width dependence on exposure power for a pit length of 0.45 µm.

FIG. 6 is a graph for pit width (μm) dependence on exposure power (mW) for a 0.45 μm-long pit, showing the exposure sensitivities of the photoresists exposed by a master writer which direct-writes on the photoresist surface in a point by point fashion. In FIG. 8, the closed signs represent the case of saturation development while open signs represent half tone development. As is apparent from FIG. 6, the sensitivities of the g-line type photoresists #1 and #2 are about ten times the sensitivities of the i-line type photoresists #3 and #4. Accordingly, when the exposure power is controlled to a level between the sufficient exposure power for the g-line type photoresists #1 and #2 and the critical exposure power for the i-line type photoresists #3 and #4, exposure can be performed such that the g-line type photoresist #1 or #2 is effectively exposed while the i-line type photoresist #3 or #4 is not effectively exposed. In general, the sensitivity of the second photoresist film is preferably five times higher than that of the first photoresist layer.

Figure 7A:
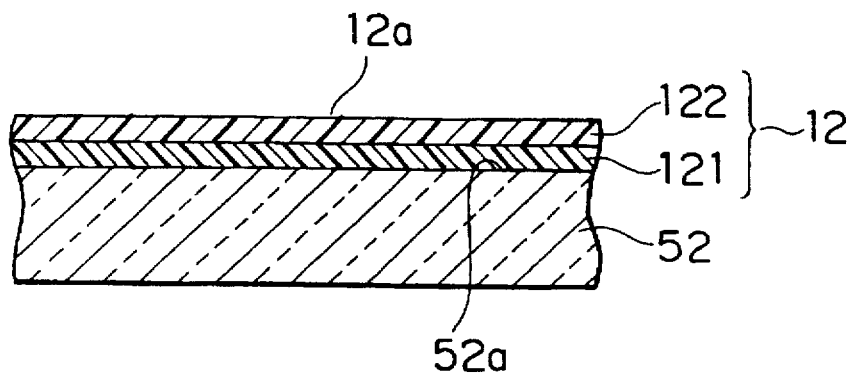
FIGS. 7A and 7B are sectional views of the master disc of FIG. 3 at a stage after spin-coating of photoresist and at a subsequent stage during laser exposure, respectively.
Figure 7B:
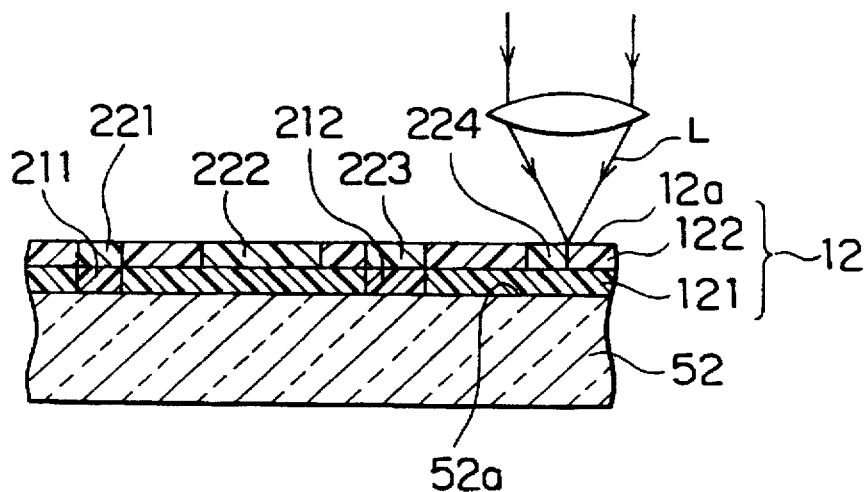
Figure 7C:
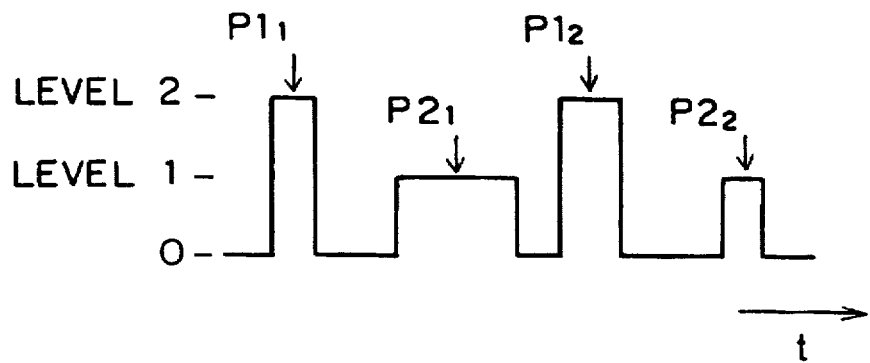
FIG. 7C is a waveform of the laser light for showing the exposure power thereof during the scanning exposure stage of FIG. 7B.

The master disc according to the present embodiment is manufactured by a method according to an embodiment of the present invention. FIGS. 7A and 7B show a master disc at stages after photoresist spin-coating and during a scanning exposure, while FIG. 7C shows an example of the exposure power of the master writer during the scanning exposure of FIG. 7B. The method for manufacturing the master disc will be described with reference to these and other drawings mentioned before.

As shown in FIG. 7A, i-line type photoresist #3 or #4 is applied onto the surface 52a of the substrate 52, which is made of transparent glass, to form a first photoresist layer 121. Subsequently, g-line type photoresist #1 or #2 is applied onto the photoresist layer 121 to form a second photoresist layer 122. With this operation, a photoresist laminate 12 is formed on the substrate 52. Subsequently, the substrate 52 having thereon the photoresist laminate 12 is subjected to pre-baking at a temperature of 80°–100° C.

As has been described with reference to FIG. 5, there is a sufficiently great difference between the photosensitivities of the g-line type photoresists and the i-line type photoresists. That is, as is apparent from FIG. 6, pits can be formed in the layer of the g-line type photoresist #1 or #2 by an exposure power which is about one tenth of the exposure power required to form pits in the layer of the i-line type photoresist #3 or #4. When the wavelength of the laser beam L is selected at 363.8 nm (ie., in the ultraviolet range), the laser beam L is controlled to have a power level between 0.15 and 0.2 mW to expose only the photoresist layer 122 formed at the surface, and controlled to have a power level between 1.5 and 2.0 mW to bleach both the photoresist layers 121 and 122. The photoresist laminate 12 is bleached by using the scanning laser beam L while switching the laser power at a level selected from three levels, namely, zero level, a first level and a second level such as shown in FIG. 7C. The scanning operation is performed for the entire surface of the photoresist laminate, as shown in FIG. 7B. Thereafter, the exposed portions 211, 212, and 221–224 are removed to obtain the master disc 10 as shown in FIG. 3. Finally, the substrate including the photoresist laminate having pits are after-baked for a final product of a master disc.

The thicknesses of the photoresist layers 121 and 122 are determined, if the first pits are used for a servo-signal and the second pits are used for data pits, such that a signal obtained by reproducing a RF signal from an optical disc which is manufactured from the master disc has a maximum of the phase difference between the two pits, taking in account of separation of tracking servo signal and the RF signal. The optimal thicknesses of the photoresist layers 121 and 122 depend on the wavelength of a light source used for reproduction of the data. For example, when a laser diode emitting near infrared rays having a wavelength of 800 nm is used for the reproduction, and the total thickness of the photoresist laminate is $\lambda/4$ or 130 nm, with the refractive index 1.5 of the substrate 52 being taken into account, the thickness of the photoresist layer 122 is set between $\lambda/8$ and $\lambda/4$, i.e., 65 and 130 nm. Also, when the photoresist layer 122 has a thickness of $\lambda/4$ or 130 nm in that condition, the total thickness of the laminate is set between $\lambda/4$ and $3\lambda/8$, or 130 and 195 nm.

Since above embodiments are described only for examples, the present invention is not limited to such embodiments and it will be obvious for those skilled in the art that various modifications or alterations can be easily made based on the above embodiments within the scope of the present invention. For example, three or more kinds of photoresists may be coated to form a photoresist laminate including three or more photoresist layers. In this case, three or more exposure power levels are selectively used for exposure of the photoresist laminate.

What is claimed is:

1. An apparatus for manufacturing a stamper of an optical disc, comprising:
   a master disc, including
      a substrate having a main surface, and
      a photoresist laminate including a first photoresist layer formed on said main surface and a second photoresist layer formed on said first photoresist layer,
      said photoresist laminate having a first pit revealing said main surface of the substrate and a second pit revealing said first photoresist layer,
      said second photoresist layer having a photosensitivity higher than the photosensitivity of said first photoresist layer;
   and a scanning light source having a selectable beam intensity;
   wherein said scanning light source operates substantially at an ultra-violet wavelength.

2. An apparatus as defined in claim 1 wherein the photosensitivity of said second photoresist layer is approximately five times higher than the photosensitivity of said first photoresist layer.

3. An apparatus as defined in claim 1 wherein the photosensitivity of said second photoresist layer is approximately one order higher than the photosensitivity of said first photoresist layer.

4. An apparatus as defined in claim 1 wherein said second photoresist layer is made of g-line type photoresist and said first photoresist layer is made of i-line type photoresist.

5. An apparatus as defined in claim 1 wherein said selectable beam intensity includes a first intensity insufficient to expose said second photoresist layer, a second intensity high enough to expose said second photoresist layer but not high enough to expose said first layer, and a third intensity high enough to expose both the first and second photoresist layers.

6. An apparatus of claim 1 wherein said selectable beam intensity includes at least two steps in which the second step is five to ten times the intensity of the first step.

7. An apparatus for manufacturing a stamper of an optical disc, including
   a substrate having a main surface;
   a photoresist laminate including at least two photoresist layers wherein
      a first photoresist layer is formed on said main surface and a second photoresist layer formed on said first photoresist layer, and any additional photoresist layers are formed on a preceding layer;
   said photoresist laminate having a plurality of pits, each having a depth corresponding to the number of exposed photoresist layers;
   each said photoresist layer having a photosensitivity higher than the photosensitivity of at least one preceding photoresist layer; and
   a light source having a selectable beam intensity;
   wherein said light source operates substantially at an ultraviolet wavelength.

8. An apparatus of claim 7 wherein said light source has a plurality of beam intensity settings corresponding to an exposure power necessary to fully expose one photoresist layer but not the next.

9. An apparatus of claim 7 wherein at least two of said photoresist layers are of an i-line type photoresist and a g-line type photoresist.

10. A method for manufacturing a master disc for a stamper of an optical disc, said method including steps of:
   forming a photoresist laminate including a first photoresist layer and a second photoresist layer consecutively formed on a master disc substrate, the second photoresist layer having a photosensitivity higher than the photosensitivity of the first photoresist layer;
   exposing, by a scanning light source, the photoresist laminate while selecting an intensity level from a set of preselected intensity levels of the scanning light source; and
   developing the photoresist laminate to form therein a first pit revealing the substrate and a second pit revealing the first photoresist layer;
   wherein said scanning light source operates substantially at an ultra-violet wavelength.

11. A method for manufacturing a master disc as defined in claim 10 wherein the photosensitivity of the second photoresist layer is approximately five times higher than the photosensitivity of the first photoresist layer.

12. A method for manufacturing a master disc as defined in claim 10 wherein the photosensitivity of the second photoresist layer is approximately one order higher than the photosensitivity of the first photoresist layer.

13. A method for manufacturing a master disc as defined in claim 10 wherein the second photoresist layer is made of g-line type photoresist and the first photoresist layer is made of i-line type photoresist.

14. A method as defined in claim 10 wherein said set of preselected intensity levels of said scanning light source includes at least three levels: a first intensity insufficient to expose said second photoresist layer, a second intensity high enough to expose said second photoresist layer but not high enough to expose said first layer, and a third intensity high enough to expose both the first and second photoresist layers.

15. A method as defined in claim 10 wherein at least one level in the set of preselected intensity levels is five to ten times the intensity of another level.

* * * * *